Patented Oct. 10, 1922.

1,431,845

UNITED STATES PATENT OFFICE.

JACQUES DANIEL SÉE, OF PARIS, FRANCE, ASSIGNOR TO SOCIETE ANONYME DES ETABLISSEMENTS HUTCHINSON, OF PARIS, FRANCE.

WATERPROOFING AND GASPROOFING COMPOSITION.

No Drawing. Application filed June 25, 1919. Serial No. 306,644.

*To all whom it may concern:*

Be it known that I, JACQUES DANIEL SÉE, of 124 Avenue des Champs Elysées, Paris, France, have invented a Waterproofing and Gasproofing Composition, of which the following is a full, clear, and exact description.

This invention has for its object a new adhesive composition having special qualities of flexibility and impermeableness and applicable more especially to the waterproofing or rendering impermeable of fabrics in general and articles of all kinds.

This composition consists essentially of a mixture of acetate of cellulose and caoutchouc (india rubber).

These two bodies may coexist in the colloidal form in suitable common solvents. More especially there can be employed as solvents hydrocarbon compounds containing chlorine, used either alone, or mixed together or with any other solvents.

This mixture can moreover include any substance which is capable of rendering plastic the acetate of cellulose and is not liable to precipitate the caoutchouc.

The improved composition can be made either hot or cold.

By the way of indicating a useful method this composition can be produced in the following manner:—

Caoutchouc and acetate of cellulose are dissolved in tetrachlorethane, for example in the following proportions:—

Caoutchouc _____ 20 parts
    Acetate of cellulose _____ 60 parts
    Tetrachlorethane _____ 600 parts It is obvious that these proportions can be varied according to the nature of the fabrics or articles to be treated and according to their applications.

To the composition is added a substance which will render the acetate of cellulose plastic and the composition pliable. Any one of the following known substances for the purpose may be employed: benzyl alcohol, triacetine, dicresyline, diphenylamine and pyridine.

The solution thus obtained is spread in a large number of layers on the fabrics or articles to be rendered waterproof or impermeable, either by hand, or by means of a gumming machine, for example of the type known as "spreading machine," or by any other means.

This solution, spread on a light and close or tightly woven fabric, permits the formation of a membrane of very small weight, waterproof, perfectly impermeable to gases in general and in particular to hydrogen, and consequently capable of being employed with advantage as an envelope for balloons or dirigibles.

In the composition of this coating there can be also incorporated sulphur, an accelerator of vulcanization, and the coating can be vulcanized either under the action of steam or hot air, or without heat by means of chloride of sulphur.

There can also be mixed with the caoutchouc entering into the composition of the improved coating any organic or inorganic loading materials, either coloured or not, which are at present employed.

The coating obtained by this process offers the advantage of possessing simultaneously the following qualities:—great flexibility, complete impermeability in respect of water and gases, perfect resistance to external agents, and great adhesive power superior to that of caoutchouc.

By reason of its special qualities, this new coating can receive numerous industrial applications, for example it can be employed more especially for the waterproofing or rendering impermeable of fabrics and articles of all kinds, for forming the envelopes of balloons and aeroplanes, and for like purposes.

The improved composition can also be applied to the manufacture of adhesive films, serving for example for gumming photographic proofs on to any support.

Claim—

A waterproofing and gasproofing composition comprising acetate of cellulose, caoutchouc, a solvent for the acetate of cellulose and caoutchouc, a substance for rendering the acetate of cellulose plastic, and sulphur.

The foregoing specification of my improved adhesive composition, more especially applicable for use in waterproofing fabrics, and rendering the same impermeable to gases, signed by me this 4th day of June, 1919.

JACQUES DANIEL SÉE.